United States Patent [19]

Larsen

[11] 4,123,491

[45] Oct. 31, 1978

[54] PROCESS FOR MANUFACTURING HIGH STRAND COUNT PLASTIC NET

[75] Inventor: Ronald L. Larsen, Minneapolis, Minn.

[73] Assignee: Conwed Corporation, St. Paul, Minn.

[21] Appl. No.: 785,862

[22] Filed: Apr. 8, 1977

Related U.S. Application Data

[63] Continuation-in-part of Ser. No. 653,474, Jan. 29, 1976, abandoned, and Ser. No. 653,541, Jan. 29, 1976, abandoned, which is a continuation of Ser. No. 697,492, Jan. 12, 1968, abandoned.

[51] Int. Cl.² .............................................. B29C 17/02
[52] U.S. Cl. ..................................... 264/167; 156/229; 156/244.25; 264/146; 264/210 R; 264/288; 264/289; 264/DIG. 81; 428/134; 428/224; 428/255
[58] Field of Search .............................. 264/288–290, 264/167, 210 F, DIG. 87, 146; 428/134, 224, 255; 156/229, 244

[56] References Cited

U.S. PATENT DOCUMENTS

| | | | |
|---|---|---|---|
| 3,186,893 | 6/1965 | Mercer | 264/DIG. 81 |
| 3,365,352 | 1/1968 | Burleigh et al. | 264/DIG. 81 |
| 3,386,876 | 6/1968 | Wyckoff | 428/134 |
| 3,554,853 | 1/1971 | Mercer et al. | 428/134 |
| 3,666,609 | 5/1972 | Kalwaites et al. | 428/134 |
| 3,881,381 | 5/1975 | Kalwaites | 428/134 |
| 3,968,621 | 7/1976 | Poupitch | 264/289 |

FOREIGN PATENT DOCUMENTS

1,235,901  6/1971  United Kingdom ............ 264/DIG. 81

*Primary Examiner*—Jay H. Woo
*Attorney, Agent, or Firm*—Eyre, Mann, Lucas & Just

[57] ABSTRACT

The present invention is directed to the manufacture of plastic net formed by extruding a plurality of spaced strands of plastic into a net structure. In accordance with the invention, adjacent strands in the net are joined in physical contact throughout all or a substantial portion of the length of the strand between the joints in the net structure. The strands are merged and integrally consolidated in the joints so that in effect the extruded structure is a solid sheet with or without perforations between the strands. Thereafter the strands are stretched preferably in two different directions to draw the strands apart and separate them throughout the length of the strands between the joints to form a high strand count oriented net produced for the first time by extrusion.

17 Claims, 7 Drawing Figures

PROCESS FOR MANUFACTURING HIGH STRAND COUNT PLASTIC NET

BACKGROUND OF THE INVENTION

The present application is a continuation-in-part of application Ser. No. 653,474 filed Jan. 29, 1976 and of application Ser. No. 653,541 filed Jan. 29, 1976 the latter in turn being a continuation of application Ser. No. 697,492 filed Jan. 12, 1968, all abandoned.

The continuous extrusion of plastic net started in about 1956 in accordance with the process of the Mercer U.S. Pat. No. 2,919,467. The process is carried out by means of two rotating die members. In essence, there is an outer rotating die member in the form of a flat horizontal circular plate having an opening in the center thereof and an inner rotating die member in the form of a flat circular plate which is nested in the opening of the outer die member. Sliding contact between the two die members establishes a liquid seal. Each die member has a plurality of spaced orifices in the form of open grooves in the contacting surfaces between the two die members. Strands of plastic are continuously extruded in vertical direction in a circle through the open groove orifices and the die members are preferably counter rotated so that each time an open groove orifice in the outer rotating die member is aligned with an open groove orifice in the inner die member an integral joint is formed between adjacent strands. The resulting product is an extruded tube of plastic net which in general has diamond shaped openings extending along the length of the tube. The Mercer process has been and now is widely used and there are licensees using the process in all of the more important industrial countries in the world.

The United States and French licensees of the Mercer process each independently made a modification wherein the outer die is held stationary while the inner die member is reciprocated in vertical direction to separate the contacting surfaces between the two die members. In the preferred structure, there are no open groove orifices in the contacting surface of one of the die members. A plurality of spaced plastic strands are continuously extruded vertically in a circle through the open groove spaced orifices in the stationary outer die member. The inner die member is periodically separated from the outer die member to separate the contacting surfaces and thereby extrude a transverse circular strand that forms an integral joint that connects the transverse circular strand with all of the spaced vertical strands. As a result a tube of plastic net is extruded which in general has square shaped openings extending along the length of the tube. This continuous extrusion of square mesh net is described in the Hureau U.S. Pat. No. 3,252,181 and in the Galt U.S. Pat. No. 3,384,692 and in the Lemelson Reissue U.S. Pat. No. Re. 28,600. Square mesh net is also being extruded commercially in all of the more important industrial countries throughout the world.

There are also a number of other modified forms of the basic Mercer process in use. In one form plastic strands are continuously extruded through a plurality of spaced orifice openings arranged in a straight line in a stationary die member. There are a plurality of spaced cooperating nozzles having orifices therein which are moved back and forth between two adjacent orifices in the stationary die member. Plastic strands are continuously extruded through the nozzle orifices and each time the nozzle orifice contacts an orifice in the stationary die the two strands are welded together and as the nozzle moves away, the strands separate until the nozzle orifice contacts the next adjacent orifice in the stationary die member when these two strands are welded together. As a result a plastic net is formed with a diamond type opening along the length of the extruded net. The net may be extruded as a flat sheet or as a tube by using a circular stationary die member. This modified form of the basic Mercer process is described in the Nalle U.S. Pat. No. 3,127,298. It is not necessary to use the Nalle nozzle orifices. For example, a plurality of spaced open groove orifices may be arranged in the contacting surfaces of each of two flat plate die members. At least one of the plates is adapted to slide back and forth so that any one groove orifice in the moving plate will make contact with and move between two adjacent groove orifices in the stationary plate while plastic strands are continuously extruded through the orifices. As a result, the strand from any one groove orifice in the moving plate continuously forms connecting links between two adjacent strands extruded by the stationary plate to form a net structure. This modified form of apparatus is shown in FIG. 8 of the Mercer U.S. Pat. No. 2,919,467. Instead of sliding the moving plate, it may be periodically displaced relative to the stationary plate to separate the two contacting surfaces. In this case, the contacting surface of the moving plate may be smooth without any groove orifices therein. When the surface of the plates are in contact a first plurality of spaced strands will be extruded from the stationary plate and when the contacting surfaces are periodically separated a transverse strand will be extruded to connect all of the first plurality of spaced strands into a net structure with integral joints. This modification is shown in FIG. 21 of the Hureau U.S. Pat. No. 3,252,181.

In another modified form of apparatus, plastic is continuously extruded through an open slit orifice which can be arranged in a circle or straight line in a first stationary die member. A second cooperating moveable die member is employed to stop the flow of plastic at one or more spaced areas along the fixed orifice opening in the stationary die member. In the most simple form of structure, the second moveable die member is in the form of a comb that slides back and forth across the orifice slit in the stationary die member. When the teeth of the comb are retracted from the slit a continuous strand of plastic is extruded and when the teeth of the comb interrupt the slit a plurality of spaced strands are extruded transverse to the continuous strand of the slit. All of the strands are integrally joined together in the resulting net structure. This modification is shown in FIG. 1 of the Hureau U.S. Pat. No. 3,252,181. The same principal may be employed in extruding a tube of net from an annular slit orifice as illustrated in FIG. 12 of the Hureau U.S. Pat. No. 3,252,181. In the place of a comb, the moveable die member may be in the form of a flat plate having an open slit therein in the form of a comb or any other desired configuration. The slit in the moving plate periodically interrupts the fixed slit opening in the stationary die member to form a net structure. This modification is shown in FIG. 10 of the Hureau U.S. Pat. No. 3,252,181.

The disclosures of the above-mentioned issued patent documents are incorporated by reference into the present specification.

In all of these processes for extruding plastic net, at least one set of strands is extruded through a plurality of spaced individual orifices. The second set of strands in the net structure may be extruded through a second set of spaced individual orifices or the second set of strands may be extruded periodically through a continuous orifice slit arranged in a straight line or in a circle. In all cases the two sets of strands are extruded so that the individual strands intersect at an angle and form integral joints in the extruded plastic net. The resulting extruded flat sheet or tube of plastic net is cooled to set the plastic in the strands as for example in a water bath and the net is drawn away from the extrusion orifices by nip rolls or other suitable drawing means. When a tube of net is extruded, it is usually drawn down over a cylindrical mandrel which may stretch the strands and enlarge the openings in the net structure. Stretching the strands over the mandrel partially orients the plastic but in practice the net is characterized as being unoriented.

For many applications, it is desirable to further stretch the net strands and more fully orient the plastic and this may be done by so-called rope orientation where as in the case of net with diamond shaped holes the tube of extruded net is heated and stretched longitudinally to further elongate and orient the strands. Stretching the tube causes it to collapse while the tube is stretched out in rope form. Square mesh net is preferably oriented to advantage in a two step process as described in my copending application Ser. No. 653,541. Here, a flat sheet of extruded net is heated and one set of strands is further stretched and oriented in one direction and in a second separate step the second set of strands are stretched to orient the strands in a second direction. Some plastic net may be oriented at room temperature but as a practical matter the net is heated to speed up and facilitate orientation of the net.

In general extruded plastic net is classified according to the strand count and weight. The strand count is the number of strands per linear inch in each set of strands. The strand count in a net with square or diamond shaped holes may be readily determined by counting the number of holes and fractions thereof per inch of net. The measurement is made at a right angle to one set of strands starting at the center line of a selected strand and the number of holes and fractions thereof in one inch is recorded. A second measurement is made in the same way at a right angle to the second set of strands and recorded. Thus, if there are 4.5 holes per inch of net for one set of strands and 5.5 holes for the second set of strands in 1 inch of net structure, there will be 4.5 strands per inch for the one set of strands and 5.5 strands per inch for the second set of strands. For convenience this net is characterized as a 4.5 $\times$ 5.5 or 5.5 $\times$ 4.5 strand count net. A 6 $\times$ 6 strand count net has 6 strands (holes) per inch in each set of strands in each of two directions. The expression 4 $\times$ 5 strand count net or 6 $\times$ 6 strand count net etc. as used in the specification and claims is intended to mean the number of strands per inch in each of the two sets of strands per square inch of net. Weight of the net is usually specified in pounds per one thousand square feet of net.

Plastic net is also made from an extruded flat sheet of plastic by slitting, cutting, perforating or embossing the sheet in a predetermined manner to provide a multitude of small spaced openings of selected geometric configuration. In the embossing process, a multitude of small non-connecting depressions are formed with only a very thin membrane of plastic at the bottom of the depressions which may extend all or only part way across the bottom of each depression. The net is formed by stretching the sheet usually in two different directions as for example in a longitudinal direction and in a transverse direction at a right angle thereto. The stretching in two directions may be carried out simultaneously or in two separate sequential steps. Stretching the sheet causes the embossed membranes to split and fibrillate and it otherwise enlarges and expands the openings with corresponding elongation and attenuation of the full thickness portions of the sheet. Plastic net is produced from an extruded solid sheet of plastic by a number of companies in the United States and the processes are described in British Pat. No. 1,075,487 (U.S. Pat. No. 3,441,638) issued in 1967 to T. J. Smith and Nephew Limited which is incorporated by reference herein. Also see British Pat. No. 982,036 issued Feb. 3, 1965 to FMC Corporation and U.S. Pat. No. 3,881,381 issued May 6, 1975 to Johnson and Johnson and U.S. Pat. No. 3,666,609 issued May 30, 1972 to Johnson and Johnson.

THE INVENTION

Net formed by extruding strands of plastic up until now has not been fully competitive with the net formed from an extruded solid sheet of plastic. In producing net by extruding strands, the strands are extruded as sharply defined spaced individual strands in order to maintain the integrity of individual strands in the net structure. As a result, the final unoriented extruded net up until now has had a maximum strand count of about 18 $\times$ 18 which is equivalent to a balanced-net hole density at the die lips of about 500 or less openings per square inch. When fully oriented this commercial net has a strand count of about 6 $\times$ 6. There is no particular limitation in the strand count of net formed from an extruded solid sheet of plastic and the fully oriented commercial product may have a strand count of 9 $\times$ 9 or more. In some commercial applications, it is important to have a high strand count net beyond that heretofore produced in net formed by extruding individual strands.

It has now been discovered that it is not necessary to extrude sharply defined individual spaced strands in order to maintain integrity of the strands in the oriented net structure and an entirely satisfactory oriented net of high strand count has been produced. In accordance with the present invention, adjacent strands are extruded and compacted to make physical contact over all or a substantial portion of the length of the strand between the joints of the two sets of strands. The strands are merged and integrally consolidated in the joints so that in effect the extruded structure is a sheet with or without perforations between the joints. If the net is extruded as a tube, the tube is preferably slit in a longitudinal direction and the resulting sheet is heated and stretched in at least one direction and preferably in two directions. Best results are achieved by stretching the sheet in a first direction along the length of one set of regenerated strands and by stretching the sheet in a second separate step in a second direction along the length of the second set of regenerated strands.

It was quite unexpected to find that when the sheet is stretched, strands are regenerated as by attenuation of the joints and separated into well defined spaced individual strands throughout the length of the strand between the joints of the two sets of strands. Even though adjacent strands are joined together at the time of extrusion or just thereafter, the integrity of th strands is apparently maintained in the extruded structure sufficiently well to be regenerated when drawn apart during the stretching to form well defined individual strands in the fully oriented net structure. While the preferred method of stretching the extruded sheet involves a two step process, it will be understood that the extruded structure may be stretched in two directions simultaneously or only in a single direction or the extruded structure may be stretched while in the form of a tube.

The high strand count oriented net produced by extruding strands has better tensile strength and resistance to tear than comparable net produced from an extruded sheet of plastic and the extruded strands are well defined as compared to the strands produced from a sheet of plastic which tend to be fibrillated.

THE DRAWINGS

Further details of the invention and one preferred type of extrusion apparatus may be readily understood by reference to the following description and drawings in which.

Figure 1:
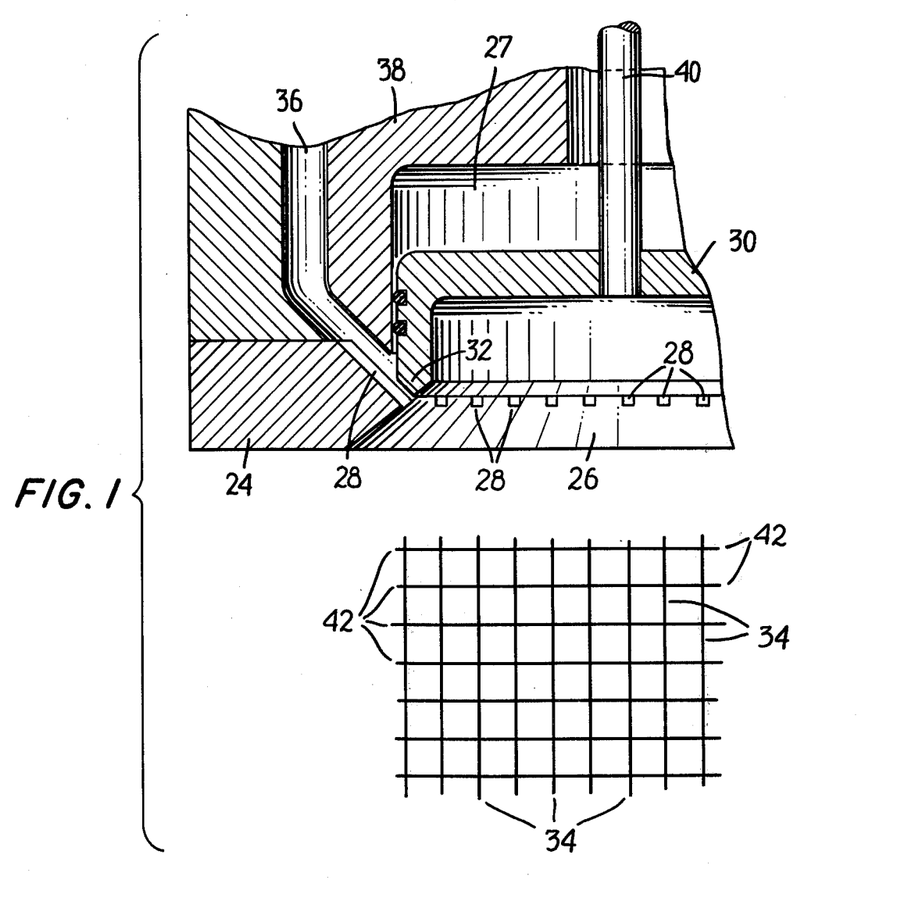
FIG. 1 is a sketch of one-half of one preferred extrusion die head for carrying out the present invention partly in section to better illustrate the parts.

Turning now to FIG. 1, the extrusion die head comprises an outer annular stationary die member 24 having a circular interior opening 26 therein. A plurality of spaced individual open groove orifices 28 are positioned in die member 24. A reciprocating piston 30 preferably without any orifices therein is nested in the opening 27 and as shown in FIG. 1 the smooth surface at the nose of piston 30 forms a seal with the lands of the grooved orifices 28 as at 32 when the piston is in its lowermost position as shown. The orifice grooves 28 remain open at all times to continuously extrude a spaced plurality of machine direction strands 34 in a circle. The plastic is continuously supplied to orifices 28 by means of an annular feed channel 36. Piston 30 is also in a sliding and sealing engagement with the inner wall of the stationary annular mandrel 38 and the outer annular surface of mandrel 38 forms the inner annular wall of the plastic feed channel 36. Piston 30 is attached in fixed position to a drive rod 40 which causes the piston to reciprocate up and down and into and out of engagement with the lands of stationary die 24. Each time the piston is lifted out of engagement with the stationary die member 24, an annular slit orifice defined by the distance between the lands of orifices 28 and the nose of the piston 30 periodically extrudes an annular transverse strand 42 of plastic to form a second set of transverse strands 42 which are connected to the machine direction longitudinal set of strands 34 at each place where the strands intersect. The resulting tube of net is drawn downwardly away from the extrusion die head over a cylindrical mandrel and through a water bath preferably by a pair of nip rolls (not shown). After the plastic strands have set the tube of net is preferably slit longitudinally and opened into a flat sheet which is accumulated on a wind up roll (not shown).

In accordance with the present invention, the strands extruded with the die head of FIG. 1 are compacted and merged to form integrally consolidated joints so that there is physical contact between adjacent strands throughout all or a substantial portion of the length of the extruded strand between joints. This compacting to merge the strands in integrally consolidated joints occurs at the lips of the die or adjacent thereto and in the high strand count net of the present invention, the extruded porous structure as measured at the die lips will have a balanced-net hole density of at least 1200 holes per square inch of net structure.

The term balanced-net hole density of 1200, 1800 etc. as used in the specification and claims is defined to be the specified number of holes in a balanced structure of a square mesh net having the same number of strands in each set of strands in one square inch of the extruded structure at the die lips without any expansion of the structure such as may be caused by drawing it away from the die. An extruded structure having a balanced-net hole density of 1200 has a strand count of about 34.6 × 34.6 at the die lips before any expansion. Unbalanced extruded structures having a different number of strands in each set of strands in each square inch of structure equivalent to a balanced-net hole density of 1200 is obvious to those skilled in the art. For example, a square mesh net (rectangular openings) having a strand count of 30 × 40 or 20 × 60 is equivalent to a balanced-net hole density of 1200 at the die lips before any expansion.

In one example of the manufacture of plastic net in accordance with the present invention, the annular stationary die of FIG. 1 had a diameter of 7.874 inches as measured at the lips of the die. This is equivalent to a circumference at the die lips of 24.737 inches and 1080 open groove orifices (28) were equally spaced around the circumference of the die member 24. The width of each groove orifice was 0.011 inch with a depth of 0.011 inch. The extruded porous structure had a balanced-net hole density at the die lips before any expansion of 1906 holes per square inch of structure with a strand count of about 43.7 × 43.7. Approximately 43.7 strands per inch of die circumference were extruded in machine direction by the open groove orifices 28 and approximately 43.7 transverse strands per inch of extruded structure were extruded through the slit annular orifice opening between the lands of orifices 28 and the nose of the mandrel when separated from the lands of orifices 28.

Polypropylene was used in extruding the tubular net-like structure, which was drawn away from the die lips over a mandrel in the water bath. The mandrel expanded the porous structure to the final extruded net hole density of about 800 holes per square inch. The tube was thereafter slit and the porous sheet taken up on a wind up roll.

Figure 2:
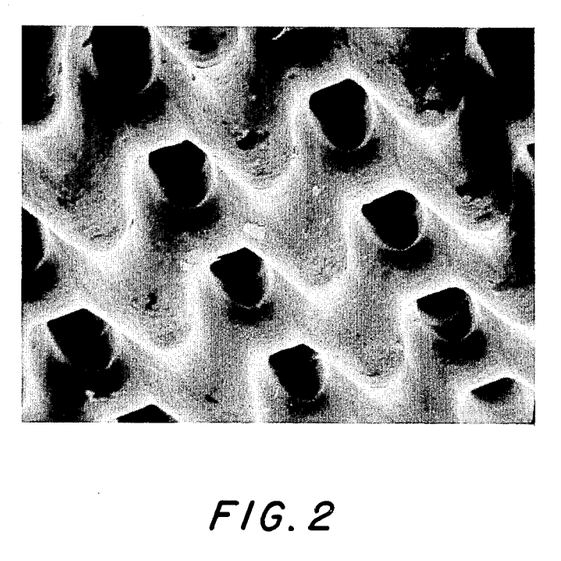
FIG. 2 is a photograph of an extruded structure produced in accordance with the present invention.

FIG. 2 is a photograph of the extruded polypropylene porous structure of this example. The photograph of FIG. 2 is a sample of the sheet taken from the wind up roll enlarged 50 times. As illustrated in the photograph the extruded polypropylene structure is a porous sheet with adjacent net strands merged and integrally consolidated in the joints.

Figure 3:
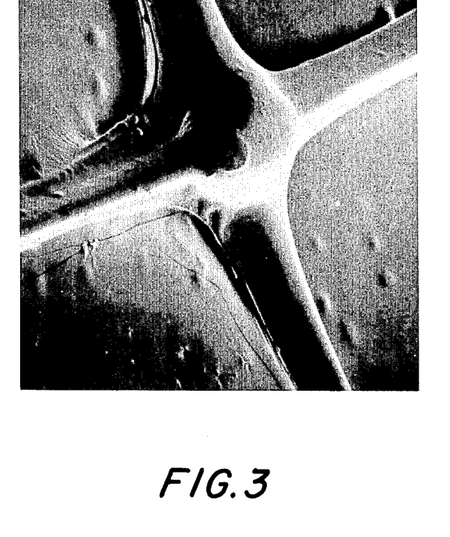
FIG. 3 is a photograph of the strands and joint of the oriented net produced from the extruded structure of FIG. 2 by stretching to open it up into a net.

The polypropylene structure of FIG. 2 was thereafter taken from the wind up roll and oriented to produce an unbalanced net having a hole density equivalent to a balanced-oriented net hole density of 82 and a strand count of 9.7 × 8.5. This oriented net is shown in FIG. 3 which is a photograph of a sample of the oriented net enlarged 50 times. As best shown by a comparison of the photographs of FIGS. 2 and 3, the individual strands were regenerated from the porous extruded sheet and drawn out and separated from the joints during orientation and the strands although pulled apart were very well defined. The stretching during orientation of the extruded porous structure of the present invention expands and elongates the structure which results in a high strand count oriented net having a balanced-oriented net hole density of at least 49 and preferably the balanced-oriented net hole density will be 64 or greater.

The term balanced-oriented net hole density of 49, 64 etc. as used in the specification and claims is defined to be the specified number of holes in a balanced oriented net structure of a square mesh oriented net having the same number of strands in each set of strands in one square inch of the net in the final commercial product after orientation. Unbalanced oriented nets having a different number of strands in each set in a square inch of net will have a hole density equivalent to that specified for the balanced oriented net.

Figure 4:
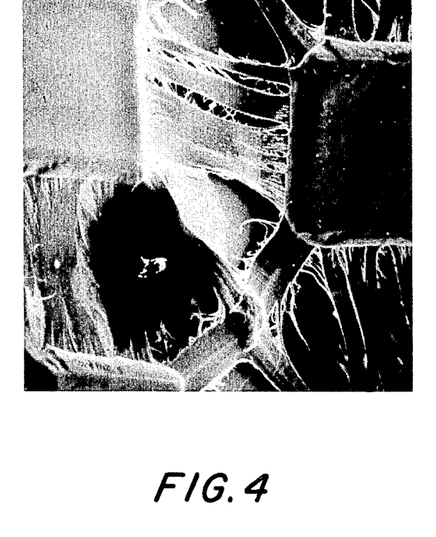
FIG. 4 is a photograph of an oriented net produced from an embossed sheet of plastic.

FIG. 4 is a photograph of a sample of the commercial net manufactured by the Smith and Nephews process produced by embossing an extruded solid sheet which is oriented to form the net as described in the Smith and Nephews British Pat. No. 1,075,487. In this photograph the sample is enlarged fifty times. As illustrated in the photograph, the stretching of the embossed sheet to open it up into a net structure of connecting strands causes extreme fibrillation and there are no well defined strands such as those produced in the oriented net of the present invention. In both cases, the plastic material is attenuated by stretching the structure to open it up into a net but in accordance with the present invention well defined strands are produced in the orientation process as compared to the fibrillated strands produced from the embossed sheet. The embossed sheet type of fibrillation shown in FIG. 4 also occurs when oriented net is produced from an extruded sheet of plastic which has been slit, cut or perforated with or without embossing. Stretching the extruded porous structure of the present invention to expand it and produce the oriented net may be carried out in conventional known manner. In general the plastic is heated and then stretched. If desired the structure may be stretched while in the form of a tube but it is of advantage to stretch and orient a sheet of the porous structure in accordance with the teaching of my copending application Ser. No. 653,541. As described in my copending application the extruded structure of the present invention is stretched in a first direction as along its length to produce longitudinal strands and in a second subsequent step it is stretched in a second transverse direction to produce the transverse strands. Stretching in this manner tends to increase the heat stability of the resulting net and for strength the stretching is controlled to avoid visible webbing at the joints of the strands.

Figure 5:
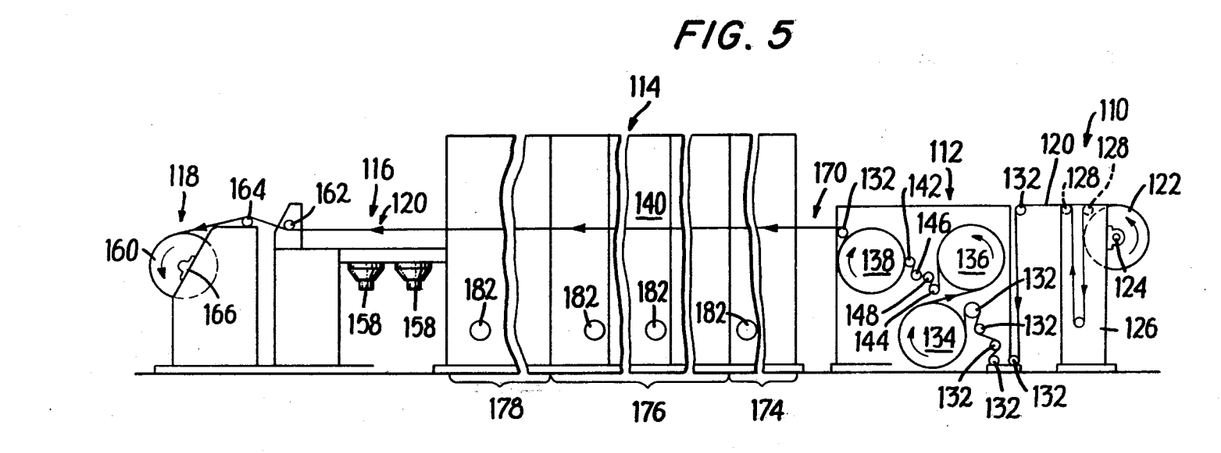
FIG. 5 is a diagrammatic illustration in side elevation of one preferred form of orienting apparatus.
Figure 6:
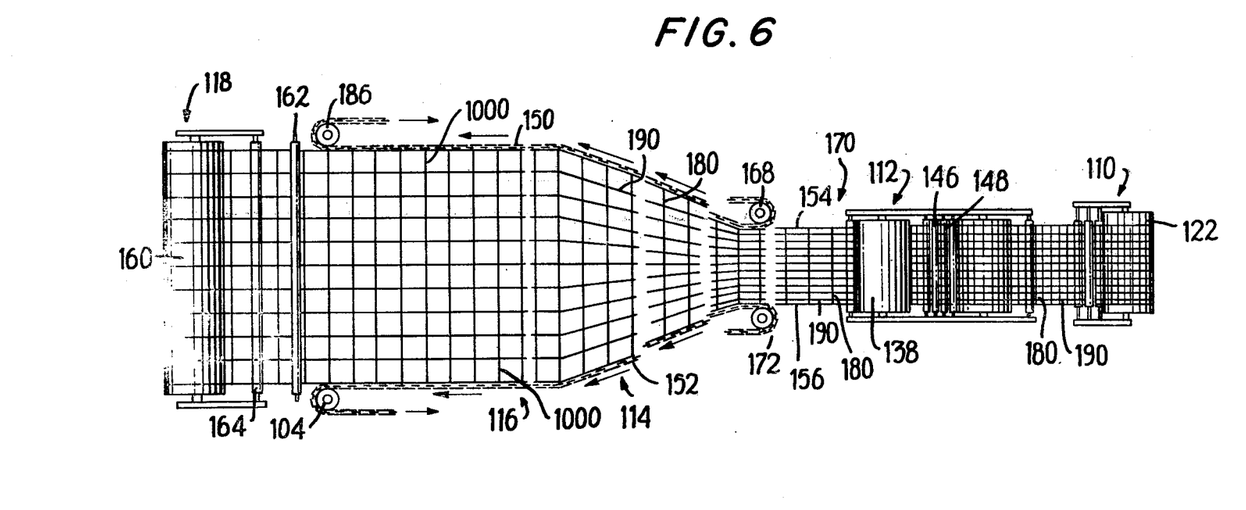
FIG. 6 is a diagrammatic illustration in top plan view of the apparatus of FIG. 5.

The apparatus for stretching the porous structure of the present invention in accordance with the teaching of my copending application is illustrated in FIGS. 5 and 6.

Having reference now to the drawings, FIG. 5 shows schematically the orienting device as comprising a roll holder 110 for holding the infeed roll 122 of the extruded net 120. Reading from right to left in FIG. 5, the successive elements of the device, after the roll holder 110, are a longitudinal stretching mechanism 112, an oven and transverse stretching mechanism 114, a cooling mechanism 116, and a takeup mechanism 118. The roll 122 of net material is removably journalled at 124 in the frame 126 which also supports various idler rolls 128. The net 120 is fed from the roll 122 around the idler rolls 128 and into the longitudinal stretching mechanism 112 which comprises a frame supporting various idler rolls 132 and three large heated rolls 134, 136 and 138. Disposed between the two large heated rolls 136 and 138 is a set of four rolls comprising two idler rolls 142 and 144, and two longitudinal stretching rolls 146 and 148.

After leaving the longitudinal stretching section 112 and the various rolls supported therein, the net is transported to and through a transverse stretching mechanism 114 comprising an oven 140 and two spaced, horizontally-disposed, endless chain members 150 and 152 (see FIG. 6). The endless chain members 150 and 152 have suitable grippers (not shown) thereon for gripping the edges 154 and 156, respectively, of the net 120 for transporting the same through the oven 140 and for pulling the net transversely as hereinafter described.

After issuing from the transverse stretching mechanism 114, the net is carried by the endless chains 150, 152 over a cooling section 116 comprised of one or a plurality of blowers 158 which blow cooling air through the net 120. After leaving the cooling section 116, the net 120 passes over suitable idler rolls as illustrated, for example, by rolls 162 and 164, and is taken up on the roll 160 of the takeup section 118. The roll 160 is formed on a shaft 166 which is suitably driven by a mechanism not shown to take up the net 120. Both edges of the sheet of net are preferably trimmed and removed before winding.

It is to be understood that various idler rolls are used and that those shown are for illustrative purposes only since requirements of space and equipment may require different paths of travel for the net 120. Generally, the rolls 134, 136, 138, 146 and 148 as well as shaft 166 are driven at suitable speeds as hereinafter described to convey the net 120 through the device. The endless chains 150 and 152 are also suitably driven in the direction shown by the arrows 168 and 172, respectively. The other rolls shown in the device are generally idler rolls and need not be driven except to remove tension or friction from the net and, if driven, are driven at the speed of the net at the point where such net contacts any such given roll. The linear speed of the net 120 through the device is, however, not constant as will now be described.

The driven rolls 134, 136, and 148 are driven at such speeds of rotation that their peripheral speeds are about the same. The rolls 138 and 146, however, are driven at a peripheral speed greater than that of the rolls 134, 136 and 148. Generally, the peripheral speed of the rolls 134, 136 and 148 is the same as the linear speed of the net 120 as it leaves the roll 122 and passes over the various idler rolls to and through the rolls 134, 136 and 148.

The rolls 138 and 146 are driven at the same peripheral speed, which speed is that of the net 120 as it passes over such rolls and through the remainder of the apparatus including the transverse stretching mechanism 140, the cooling mechanism 116, and the takeup mechanism 118.

It will be realized that since the rolls 146 and 138 operate at a higher peripheral speed than the rolls 134, 136 and 148, the net 120, if properly heated, will stretch longitudinally in the space between the rolls 146 and 148 due to the difference in speed of these two rolls. The rolls 142 and 144 may also be driven, if desired, with the rolls 142 driven at the same peripheral speed as rolls 138 and 146 and roll 144 being driven at the same peripheral speed as rolls 134, 136 and 148.

The rolls 134 and 136 are heated to such temperature as may be required by the circumstances of the particular orientation mechanism and the particular resin composition of the net 120. For certain polypropylene resins, it has been found that a suitable temperature for these rolls is in the range of from 200° F. to 300° F. The means for heating these rolls may include the use of water, oil, or other liquid, heated and pumped through such rolls, such means not being shown since many such mechanisms are known.

The roll 138 is likewise heated but to a lesser temperature than the rolls 134 and 136 to set the resin of the net 120 in order to permit its handling and passage from the roll 138 over the area generally indicated by the reference character 170 and into the transverse stretching mechanism 114 where the net 120 is gripped by the endless chains 150 and 152. It will be realized that in the area 170, the net 120 is substantially unsupported and as such, must have some self-supporting strength. Accordingly, the roll 138 is not as hot as the rolls 134 and 136 in order that the net 120 may be slightly cooled to set the resin, thus permitting transfer across the space 170.

As indicated above, the net 120 is extended in length and thus stretch-oriented in its passage through the longitudinal stretching mechanism 112, such stretching taking place between rolls 146 and 148 by virtue of the different peripheral speeds of the rolls 146 and 148 and the heated condition of the net at the time it passes over and between these rolls. This is shown diagrammatically in FIG. 6 in which the net 120 is shown as consisting of transverse strands 180 and longitudinal strands 190. As best shown in the area between the infeed mechanism 110 and the longitudinal stretching mechanism 112 in FIG. 6, it will be realized that the transverse strands 180 and the longitudinal strands 190 define open mesh areas in the net 120 which are substantially square in the embodiment shown. After having passed through the longitudinal stretching mechanism 112 the longitudinal strands 190 have been stretched substantially and may be stretched two or more times their original length but the transverse strands 180 have remained at their original length as best shown in the area 170 in FIG. 6.

The transverse stretching mechanism 114 includes the oven 140 containing generally three sections as indicated by the reference characters 174, 176 and 178. These sections of the oven 140 are heated by any suitable means including, for example, a hot gas blowing mechanism, such as indicated at 182. Generally, the section 174 is a preheating section, section 176 is a transverse stretching section and section 178 is a heat-setting section which may be kept at a higher temperature. For a typical polypropylene resin, the various sections 174, 176 and 178 are kept at a temperature in the range of from 250° F. to 325° F. Adjustment of the temperature in the three sections is within the skill of the art.

Upon entering the transverse stretching mechanism 114, the net 120 is gripped on its edges 154 and 156 by suitable grippers or pins (not shown) on the endless chains 150 and 152, respectively. The endless chains 150, 152 are arranged in a suitable track (not shown) which guides such chains 150, 152 initially along two parallel straight paths in the section 174 of the oven and then along diverging paths in the section 176 of the oven as shown in FIG. 6, and then again along parallel straight paths in section 178 of the oven. The paths of the chains 150, 152 in section 178 are more widely spaced than in section 174.

The endless chains 150, 152 carry the net 120 through and out of the oven 140 and then over the cooling fans 158 which blow room temperature air through the net to cool the same to or close to room temperature. At or near the point where the chains 150 and 152 are trained around the sprockets 184 and 186, respectively, the net 120 is released from the grippers of the chains 150 and 152 and is then taken up by the roller 160 driven by the driving shaft 166.

By reference to FIG. 6 of the drawing, it will be seen that during the passage of the net 120 through the section 176 of the oven, the transverse strands 180 are stretched in length since the chains 150 and 152 are diverging during this point of their travel. In the embodiment, the strands 180 are shown stretched to approximately 3 times their original length. At the same time, the longitudinal strands 190 are not increased in length but retain the length given to them during travel through the longitudinal stretching device 112. This is evident from FIG. 6 when one compares the net 120 as shown in the area 170 to the net as shown after having passed through the section 176 of the oven. At the point 170, the transverse and longitudinal strands 180 and 190, respectively, define relatively elongated rectangles elongated in the direction of travel of the net. As shown after having issued from the section 176 of the oven, however, the strands 180 and 190 are shown as defining relatively large square openings in the net 120 of the same shape but of different dimension as compared with the original net 120 as it issued from the roll 122.

It is not necessary, of course, that the net 120 start out with square openings which are then transformed to elongated rectangles and then finally to larger square openings, such having been shown merely for clarity of illustration in the drawings. Obviously, as shown, the passage of the net through the device is such that there occurs pulling and stretching of the net strands first in one rectilinear direction in the longitudinal stretching mechanism 112 and secondly in a right angular transverse direction in the transverse stretching mechanism 114.

In general the plastic structure to be stretched is heated at least to a temperature at which the molecules of the particular polymer may be oriented by stretching. One set of strands only is then stretched while heated. After completion of this orientation-stretching, the structure may or may not be cooled slightly depending on the design of the equipment employed. If cooled, the structure is again heated at least to a temperature suitable to permit the orientation of the molecules of the particular polymer. While so heated or when so heated, the second set of strands only is stretched to orient the molecules. Finally the net is cooled.

The particular temperatures employed will depend upon a number of variables and must be determined empirically for each set of circumstances. It is generally considered that orientations of the molecules can take place at a second transition point, however, for practical commercial operation the required temperature may be considerably higher. The second transition point for polypropylene, for example, is approximately room temperature, and orientation can be carried out very slowly at this temperature. But as a practical matter, quantity commercial operation is carried out at temperatures generally in the range of 200° F. to 325° F.

While the above description is directed to orienting conventional net, the extruded porous sheet of the present invention is preferably oriented to draw out and separate the strands by using the two step sequential process as hereinabove described. In general, for well defined strands and maximum strength in the oriented structure of the present invention, the stretching is preferably carried out so as to avoid substantial visual webbing at the intersection of the strand and the joint between the strands. Visual webbing is avoided by adjusting the rate at which the structure is stretched to elongate it and by adjusting the temperatures at which the structure is stretched in the longitudinal and transverse directions. The rate of stretching and temperature for avoiding visual webbing will be different for different plastic materials and for different strand thickness and strand count.

Figure 7:
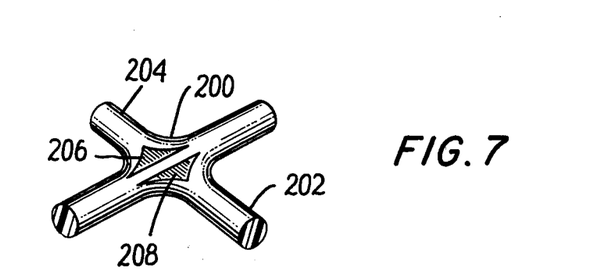
FIG. 7 illustrates the joint in an extruded oriented plastic net which has been webbed.

In general in order to avoid webbing, an oriented set of strands should not be subjected to appreciably higher temperatures during the remaining steps in the process than that temperature at which the particular set of strands was oriented. When a strand is stretched to orient it, stresses are set up in the elongated strand while the plastic in the joint remains substantially unoriented or the orientation of the joint is less than that of the strand between adjacent joints. If the oriented strand while held under restraint in the orienting apparatus is subjected to appreciably higher temperatures than the temperature at which the strand was oriented, the strand will tend to shrink in length and in so doing will form visible webbing at the intersection of the strand and the joint. For example, using the apparatus of FIG. 5, the high strand count net of FIG. 2 was oriented by maintaining the temperature of the heated rolls in the longitudinal stretching section 112 at about 270° F., and in the oven 114 which encloses the transverse stretching section at about 290° F. The resulting oriented net of FIG. 3 does not have any visible webbing at the joints. FIG. 7 illustrates the joint of a plastic net having visual webbing at the joint which tends to weaken the joint in the net. Comparing the joint 200 of FIG. 7 with the joint of FIG. 3, it will be seen that the strands 202 and 204 have decreased in length due to employing appreciably higher temperatures (such as about 350° F.) in subsequent process steps from that temperature at which the strands were oriented and as a result plastic material is pulled from the substantially unoriented joint to form webs 206 and 208. Conditions of operation for specific equipment under which the orientation is carried out are determined empirically to avoid visible webbing of the joints. It is obvious that webbing at the joints can be avoided by allowing the net structure to shrink without restraint in order to compensate for shrinkage caused by release of stresses in the strands.

In certain commercial applications, the oriented net may be subject to temperatures approaching those at which the net was oriented. As a result, the net will shrink, unless it is heat set during manufacture. In accordance with the present invention, the oriented net may be heat set by subjecting the net to temperature higher than that employed in orientation while controlling net shrinkage caused by release of stresses in the strands at the higher temperature. For example, in the case of the net of FIGS. 2 and 3, the net after orientation was heat set at a temperature of 340° F. and the net was held under partial restraint to limit shrinkage of the transverse strands to less than about 10% of their oriented length. This relieves the stresses in the oriented strands so that when the net is later subjected to temperatures approaching those of orientation in commercial application, the shrinkage of the net is reduced to acceptable commercial levels. While it is preferred to allow the net to shrink less than about 10% during heat setting, this is not necessary and the net may be held under restraint to preserve the dimensions of the oriented net.

While polypropylene is specifically mentioned in the description, it will be apparent that any plastic material which can be readily oriented may be utilized in carrying out the present invention.

In order to extrude a tubular porous sheet having a balanced-net hole density of 1200, the annular stationary die member 24 of FIG. 1 is provided with about 34.6 evenly spaced open groove orifices 28 per inch of circumference of the die member 24. For a balanced-net hole density of 1324, the annular stationary die is provided with about 36.4 evenly spaced open groove orifices per inch of circumference. Use of about 41.2 evenly spaced open groove orifices per inch of circumference of die member 24 will provided an extruded structure with a balanced-net hole density of 1700 and about 58.2 evenly spaced open groove orifices per inch of circumference of die member 24 will provide an extruded structure of balanced-net hole density of 3388. Since by definition a balanced-net hole density in the extruded structure at the lips of the die orifices will have the same number of strands in each direction the piston 30 of the die of FIG. 1 is reciprocated at that cyclic speed required to provide the same number of transverse strands per inch of length of extruded structure as the machine direction strands extruded by the spaced open groove orifice 28. For example, for a balanced-net hole density of 3388, the piston is reciprocated at that cyclic rate which is required to extrude about 58.2 transverse strands per inch of length of extruded net structure when there are about 58.2 evenly spaced open groove orifices per inch of circumference of die member 24. In the case of unbalanced extruded net-like structures, the cyclic rate of reciprocation of piston 30 may be such that there will be more or less transverse strands in the extruded structure per inch of length of extruded structure than are present in one inch of circumference of the extruded tubular structure. This same relationship between balanced and unbalanced extruded net-like structures applies to the various other form of commercial extruders described hereinabove which are used for producing plastic net by the extrusion of strands to form the structure. For example, in the Mercer apparatus of U.S. Pat. No. 2,919,467 when there are an equal number of orifices in each of the rotating die members, a balanced net structure is produced. If one die member has more or less orifices than the other die member an unbalanced net structure will be produced.

Those skilled in the art will experience no difficulty in extruding the high strand count of the present invention. But, it is well to note that the particular selected plastic will exhibit die swell as it leaves the orifice of the die. The plastic will swell as it leaves the orifice so that the resulting strand may have a greater diameter than the diameter of the orifice. Plastic with extremely high die swell will tend to produce an extruded structure with greater physical contact between the strands and smaller holes than that produced from the same die by a plastic with extremely low die swell. The rate at which the extruded structure is drawn away from the die lips will have an effect on die swell and as the rate of draw increases the die swell will decrease. It is of advantage to utilize a plastic which will exhibit die swell during extrusion since die swell is correlated to molecular weight distribution and the higher the die swell the broader the distribution. Plastics with broad molecular weight distribution will generally improve extrusion efficiency and are less difficult to control.

The swell of the extruded plastic strands as they exit from the lip of the spaced individual die orifices is an extremely complex phenomena which involves a number of interrelated parameters. However, the die swell may be increased in an empirical manner by adjusting the extrusion conditions or the configuration of the spaced orifices employed for extrusion.

Temperature of the plastic material at the lips of the spaced die orifices influences the die swell and a decrease in temperature will increase the die swell of the resin strands.

The pressure at which the resin strands are extruded through the spaced individual die orifices is another factor that influences the die swell of the strands. Increasing the pressure will increase the die swell.

The rate of extrusion of resin effects the die swell of the strands from the spaced individual die orifices. An increase in rate of extrusion will increase the die swell.

Changing any one or more of the above parameters of temperature, pressure, rate of extrusion, drawdown, configuration and number of orifices in the die member may be employed for changing the die swell of the extruded strands.

The die swell of a particular selected resin is described as the ratio of:

$$D_o/D \times 100\% = \% \text{ Die Swell}$$

$D_o$ is the average diameter of the extruded strand and D is the diameter of the selected orifice. A tested resin strand with a die swell of 100% does not expand at all during extrusion through the orifice. A tested resin strand with a die swell of 200% has expanded to twice the diameter of the test orifice. Any conventional test apparatus may be employed for testing the die swell of the selected plastic. For example, a cylindrical tube equipped with heating elements and fitted with an orifice opening at the bottom thereof and with pressure means for forcing the heated flowable plastic through the orifice may be employed. If the orifice and temperature and pressure of the test is closely related to the orifice and temperature and pressure and rate of extrusion employed in the commercial extrusion apparatus, the tested die swell of the plastic will be closely related to the die swell in the commercial extrusion. Die swell of the plastic strand extruded by the test apparatus will not in general be the same as the die swell of the strands extruded through the spaced orifices in commercial apparatus. But, a correlation between the tested die swell and any given commercial apparatus may be empirically established after a number of tests. Die swell is determined in the test apparatus by extruding a strand of selected plastic and by measuring the diameter of the strand extruded by the test apparatus. In the extrusion of polypropylene net-like structures in the apparatus of FIG. 1 in accordance with the present invention, the die swell of the plastic extruded from the lips of the die was at least about 125% for best results and in some cases the die swell was 150% and more.

It will be understood that the description and claims are intended to cover all changes and modifications of the preferred embodiment of the invention herein chosen for the purpose of illustration.

What is claimed is:

1. A process for the manufacture of oriented high strand count plastic net which comprises the steps of:
    (a) extruding a first plurality of plastic strands;
    (b) extruding a second plurality of plastic strands to intersect said first plurality of strands at an angle;
    (c) extruding the plastic strands sufficiently close together to extrude a structure with a net hole density equivalent to a balanced-net hole density of at least 1200 and thereby cause a portion of the strands between intersections to merge into integrally consolidated joints at the intersections; and
    (d) stretching the extruded structure in at least one direction to regenerate and draw out from the integral joints separate lengths of individual strands between the joints to produce high strand count oriented net having a net hole density equivalent to a balanced-oriented net hole density of at least 49.

2. The process specified in claim 1 which includes the step of extruding one of said sets of strands in a circular arrangement to form a tubular extruded structure.

3. The process specified in claim 2 which includes the steps of slitting the tubular structure to form a flat sheet and thereafter heating the flat sheet and stretching the sheet in a first direction along the length of one set of individual strands between the joints produced by stretching the sheet and in a second subsequent step stretching the sheet in a second direction along the length of the second set of individual strands between the joints produced by stretching the sheet in the second direction to form the oriented net.

4. The process specified in claim 1 in which the strands are extruded to form an extruded structure having a balanced-net hole density of at least 1200.

5. The process specified in claim 1 in which the strands are extruded and merged into a non-porous structure.

6. A process for the manufacture of oriented plastic net which comprises the steps of:
    (a) extruding a first plurality of plastic strands in a circular arrangement;
    (b) extruding a second plurality of plastic strands to intersect said first plurality of strands at an angle to form a tubular structure;
    (c) extruding the plastic strands sufficiently close together to extrude a structure with a net hole density equivalent to a balanced-net hole density of at least 1200 and thereby cause at least one set of strands in the structure to compact and make physical contact between adjacent strands along a substantial portion of the strand length between intersections;
    (d) slitting the tube to form a porous sheet; and
    (e) stretching the porous sheet in at least one direction to separate the strand physical contact and form a length of individual separate strands between the intersections to produce oriented net having a net hole density equivalent to a balanced-oriented net hole density of at least 49.

7. The process specified in claim 6 which includes the step of selecting a plastic with a die swell of at least 125%.

8. The process specified in claim 7 which includes the step of extruding and compacting the strands to produce a non-porous extruded tubular structure.

9. A process for the manufacture of high strand count oriented net which comprises the steps of:
   (a) extruding a first plurality of plastic strands in a circular arrangement;
   (b) extruding a second plurality of plastic strands to intersect said first plurality of strands at an angle and join the two sets of strands into a tubular structure;
   (c) extruding the plastic strands sufficiently close together to extrude the tubular structure with a net hole density equivalent to a balanced-net hole density of at least 1200 and thereby compacting said strands to form a tubular structure without recognizable separate strands or intersections;
   (d) selecting a plastic for the extrusion of said strands having a die swell of at least 125% to assist in compacting said strands in said tubular structure;
   (e) cooling the tube and slitting it to form a porous flat sheet;
   (f) heating the flat sheet above room temperature and stretching the sheet in a first direction to form a first set of separate strands between the intersections; and
   (g) in a second subsequent step stretching the sheet in a second direction to form a second set of separate strands between intersections and an oriented net structure having a net hole density equivalent to a balanced-oriented net hole density of at least 49.

10. The process specified in claim 9 which includes the steps of selecting a plastic having a die swell of at least 150% and extruding and compacting the strands to produce a non-porous tubular structure.

11. A process for the manufacture of oriented plastic net which comprises the steps of:
   (a) extruding a first plurality of plastic strands;
   (b) extruding a second plurality of plastic strands to intersect said first plurality of strands at an angle and join the two sets of strands in the extruded structure;
   (c) extruding the plastic strands sufficiently close together to extrude a structure with a net hole density equivalent to a balanced-net hole density of at least 1200 and thereby compacting said strands to form an extruded structure without well defined strands or intersections;
   (d) stretching the extruded structure in at least one direction to expand the structure and produce oriented net with separate individual strands and intersections; and
   (e) thereafter subjecting the oriented structure to a temperature greater than that employed in the orientation while holding the structure under partial restraint to heat set the plastic material.

12. The process specified in claim 11 which includes the step of permitting one set of strands in the extruded net structure to shrink less than about 10% of the length of the oriented one set of strands while the structure is held under partial restraint to heat set the plastic material.

13. The process specified in claim 11 which includes the step of holding the structure under full restraint to avoid shrinkage of the structure while the plastic material is heat set.

14. A process for the manufacture of oriented plastic net which comprises the steps of:
   (a) extruding a first plurality of plastic strands;
   (b) extruding a second plurality of plastic strands which intersect said first plurality of strands at an angle to join the two sets of strands in the extruded structure;
   (c) extruding the plastic strands sufficiently close together to extrude a structure having a net hole density equivalent to a balanced-net hole density of at least 1200 and thereby form an integral porous extruded structure;
   (d) orienting said structure by first stretching it in one direction to form one set of strands between the intersections;
   (e) in a second subsequent step stretching the extruded structure in a second direction to form a second set of strands between the intersections in transverse direction to said first set of strands to further orient the structure and produce an oriented net; and
   (f) maintaining the temperature of said structure during orientation at a level not appreciably above that temperature employed in the first stretching step to avoid visible webbing at the joints of the oriented net.

15. The process specified in claim 14 which includes the step of selecting a resin having a die swell of at least about 125%.

16. The process specified in claim 15 which includes the step of extruding the strands sufficiently close together to extrude an integral non-porous structure.

17. The process specified in claim 14 which includes the steps of extruding said first plurality of strands in a circle to form an extruded tube, cooling and slitting the tube after extrusion to form a flat porous sheet and then heating the flat porous sheet before orienting it.

* * * * *

UNITED STATES PATENT AND TRADEMARK OFFICE
CERTIFICATE OF CORRECTION

PATENT NO. : 4,123,491
DATED : October 31, 1978
INVENTOR(S) : Ronald L. Larsen

It is certified that error appears in the above-identified patent and that said Letters Patent are hereby corrected as shown below:

Col. 1, line 10, delete "all abandoned"

Front Page, under Related U.S. Application Data, delete "Continuation-in-part of Ser. No. 653,474, Jan. 29, 1976, abandoned, and Ser. No. 653,541, Jan. 29, 1976, abandoned, which is a continuation of Ser. No. 697,492, Jan. 12, 1968, abandoned." and insert --Continuation-in-part of Ser. No. 653,474, Jan. 29, 1976, abandoned, and Ser. No. 653,541, Jan. 29, 1976, now allowed, which is a continuation of Ser. No. 697,492, Jan. 12, 1968, abandoned.--

Signed and Sealed this

Twenty-second Day of May 1979

[SEAL]

Attest:

RUTH C. MASON
Attesting Officer

DONALD W. BANNER
Commissioner of Patents and Trademarks